US007450065B1

(12) United States Patent
Bruce et al.

(10) Patent No.: US 7,450,065 B1
(45) Date of Patent: Nov. 11, 2008

(54) OPTIMIZATION OF RADAR ANTENNA SWITCHING HYBRID IN RESPONSE TO OPERATING FREQUENCY

(75) Inventors: Gregory S. Bruce, Abington, PA (US); Timothy R. Riley, Delran, NJ (US); Wilbur Lew, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 148 days.

(21) Appl. No.: 11/472,722

(22) Filed: Jun. 21, 2006

Related U.S. Application Data

(62) Division of application No. 10/918,146, filed on Aug. 13, 2004, now Pat. No. 7,245,257.

(51) Int. Cl.
*H01Q 3/00* (2006.01)
*G01S 7/40* (2006.01)

(52) U.S. Cl. ........................ 342/360; 342/173; 342/372

(58) Field of Classification Search .................. 342/73, 342/173, 174, 360, 372
See application file for complete search history.

(56) References Cited

U.S. PATENT DOCUMENTS

| | | | | | |
|---|---|---|---|---|---|
| 4,145,692 | A * | 3/1979 | Armstrong et al. | .......... | 342/173 |
| 4,491,871 | A | 1/1985 | Schmitz et al. | | |
| 4,602,227 | A | 7/1986 | Clark et al. | | |
| 5,126,869 | A * | 6/1992 | Lipchak et al. | ............. | 349/202 |
| 5,412,414 | A | 5/1995 | Ast et al. | | |
| 6,175,747 | B1 | 1/2001 | Tanishima et al. | | |
| 6,757,267 | B1 | 6/2004 | Evans et al. | | |
| 2004/0228422 | A1 | 11/2004 | Silveira et al. | | |
| 2005/0041152 | A1 | 2/2005 | Bendov | | |

* cited by examiner

*Primary Examiner*—Dao L Phan
(74) *Attorney, Agent, or Firm*—Duane Morris LLP

(57) ABSTRACT

A radar system operates at various different frequencies, and routes power among various antennas by use of a hybrid arrangement. The system is precalibrated at each possible operating frequency by adjusting the phase shifts associated with the hybrid in a feedback manner to provide optimal performance, and the calibration values are stored. During normal operation, the calibration values of phase shift are selected and used for feedforward operation at each frequency.

2 Claims, 8 Drawing Sheets

FEED FORWARD OPERATION FLOW DIAGRAM

230
CHANNEL CALIBRATION

OPTIMIZATION OF RADAR ANTENNA SWITCHING HYBRID IN RESPONSE TO OPERATING FREQUENCY

RELATED APPLICATIONS

This application is a divisional of U.S. patent application Ser. No. 10/918,146, filed Aug. 13, 2004, now U.S. Pat. No. 7,245,257.

FIELD OF THE INVENTION

This invention relates to electromagnetic transmitters, and more particularly to computerized alignment control of systems using hybrid combiner/splitters.

BACKGROUND OF THE INVENTION

Modern transmitter systems, such as television and radar systems, require generation and phase control of high power signals. In order to obtain sufficient power, multiple high-power signal sources are often combined by the use of hybrid combiners. Those skilled in the art know that hybrid combiners may also) be used to split applied signals, and are not limited to combining.

In a radar context, the signals applied to a transmitting antenna must be steered, which requires phase control of the signals applied to each element of the antenna array. In some radar systems, the signals must be applied or "switched" to separate antenna arrays facing in different directions for transmission of electromagnetic signals in the selected directions. In the context of high-power signals such as radar pulses, the switching may be conveniently accomplished by control of the phase of signals applied to the various input ports of a hybrid combiner. Proper switching of signal by the use of a hybrid combiner requires that the phase relationship of the applied signals be closely controlled, as otherwise signals may "leak" away from the desired port to other, non-selected ports.

In the context of a radar system in which the transmission frequencies change from time to time, the frequency changes may result in undesired phase conditions at the hybrid ports, especially at the edges of a frequency band or range. These undesired phase conditions, in turn, may result in leakage of the signal away from the desired ports at some frequencies within a frequency band.

Improved or alternative phase control arrangements and/or methods are desired.

SUMMARY OF THE INVENTION

A method according to an aspect of the invention, for transmitting pulsed radar signals from any one of a plurality of antenna arrangements, comprises the step of from time to time, generating signals, such as pulses, from a plurality of signal sources. The pulses may be at various frequencies. The signals from the plurality of sources are applied to a like plurality of input ports of a multiport hybrid arrangement. The multiport hybrid arrangement includes a second plurality of output ports, which second plurality may be equal to the first plurality. In one embodiment of the invention, the multiport hybrid arrangement has eight ports, four of which are used as input ports and four of which are used as output ports. The multiport hybrid arrangement couples signals applied to its input ports to (or among) selected ones of the output ports in response to the phase relationship between the signals applied to the input ports. The signals appearing at the output ports of the multiport hybrid arrangement are coupled to a plurality of antenna arrangements. A phase alignment control arrangement is coupled to the sources, and to the output ports of the hybrid arrangement, and it is operated in a phase alignment mode for determining the phase relationship among the signals applied to the input ports of the hybrid arrangement which are required to optimize the signal amplitude applied to a selected combination of the antenna arrangements at the frequency of the signal from the sources, and for storing phase information relating to the optimum signal amplitude. In one advantageous embodiment, there are four antenna arrangements coupled to the four output ports of an eight-port hybrid arrangement, and the phase information required for optimizing the switching of the signals to one or the others of the antenna arrangements' is stored. An operational control arrangement is coupled to the sources and to the phase alignment control arrangement. The operational control arrangement is operated for selecting operational frequencies for the signal sources and the destination antenna of the signals from the signal sources. The phase of the signals applied from the sources to the input ports of the hybrid arrangement is adjusted in response to the stored phase information and the commanded operational frequency and destination antenna to optimize the coupling to one of the antenna arrangements and to optimize the power null for the other antenna arrangement.

A method according to another aspect of the invention is for aligning a radar system which uses phase-controlled steering of signals in a multitier hybrid arrangement including plural input ports and plural output ports. The method comprises the steps of selecting an operating frequency for transmission, and applying signal at the operating frequency to at the plural input ports to thereby define or produce applied signals. The relative phase shift of the applied signals is stepped while monitoring the power appearing at the plural output ports, and the power and the associated ones of the relative phase shifts are stored. The steps of selecting and applying for a plurality of operating frequencies are repeated, to thereby generate a database of output power as a function of frequency and relative phase shift.

A method according to another aspect of the invention for operating a radar system which uses phase-controlled steering of signals in a multitier hybrid arrangement including plural input ports and plural output ports comprises the steps of selecting a plurality of potential operating frequencies for transmission, and aligning the radar system. Alignment of the radar system is accomplished by the steps of (a) applying signal at one of the operating frequencies to the plural input ports, to thereby define or produce applied signals;

(b) stepping the relative phase shift of the applied signals at the one of the operating frequencies while monitoring the power appearing at the plural output ports, and storing the power and the associated ones of the relative phase shifts; and, (c) repeating the steps of applying and selecting for the plurality of operating frequencies, to thereby generate a database of output power as a function of operating frequency and relative phase shift.

The method includes the step of selecting a specific operating frequency from among the plurality of potential operating frequencies, and retrieving relative phase shifts of the signals at the specific operating frequency from the database, to thereby generate retrieved relative phase shifts. The retrieved relative phase shifts are applied whenever the specific operating frequency is selected for transmission.

DESCRIPTION OF THE INVENTION

Figure 1A:
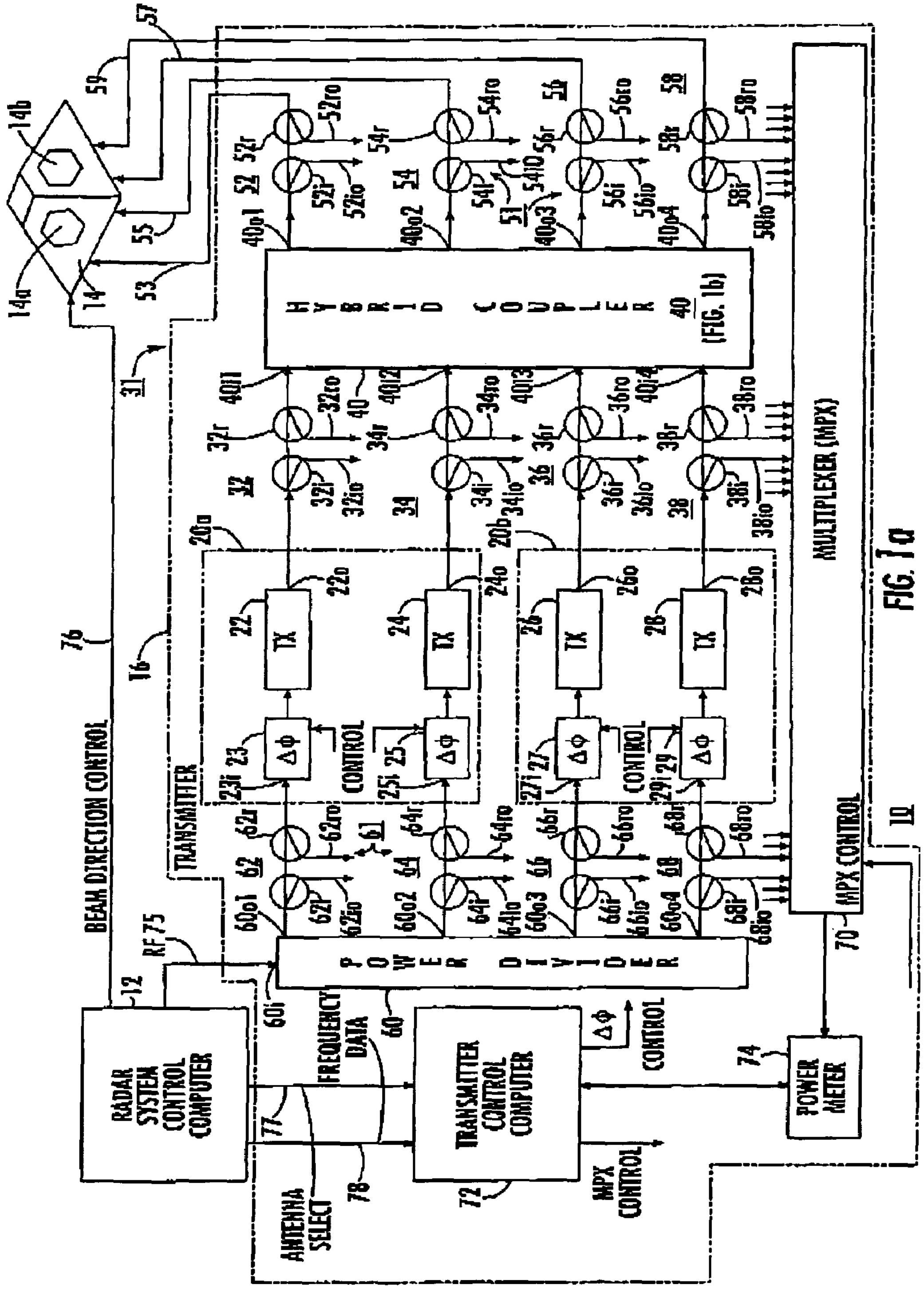
FIG. 1*a* is a simplified block diagram of a radar system according to an aspect of the invention including a hybrid arrangement.

In FIG. 1*a*, a radar system 10 includes a radar system control computer 12, a structure 14 including four antenna arrays 14*a*, 14*b*, . . . , mounted on four faces of structure 14, facing in four different directions, and a controlled transmitter 16. Transmitter 16 of FIG. 1*a* includes a first power amplifier arrangement 20*a* and a second power amplifier arrangement 20*b*. Power amplifier arrangement 20*a* includes a first power amplifier or transmitter (TX) 22 cascaded with a controllable phase shifter (ΔΦ) 23 and a redundant power amplifier 24 cascaded with a controllable phase shifter 25. Similarly, power amplifier arrangement 20*b* includes a first power amplifier arrangement or transmitter 26 cascaded with a controllable phase shifter 27 and a redundant power amplifier 28 cascaded with a controllable phase shifter 29.

FIG. 1*a* includes a set 31 of four directional coupler arrangements 32, 34, 36, and 38. Amplified signal from output port 22*o* of power amplifier 22 is applied by way of a directional coupler arrangement 32 of set 31 to a first input port 40*i*1 of a multiport hybrid coupler arrangement 40, and amplified signal from output port 240 of power amplifier 24 is applied by way of a directional coupler arrangement 34 of set 31 to a second input port 40*i*2 of hybrid coupler arrangement 40. Similarly, amplified signal from output port 260 of power amplifier 26 is applied by way of a directional coupler arrangement 36 of set 31 to a third input port 40*i*3 of hybrid coupler arrangement 40, and amplified signal from output port 28*o* of power amplifier 28 is applied by way of a directional coupler arrangement 38 of set 31 to a fourth input port 40*i*4 of hybrid coupler arrangement 40.

Figure 1B:
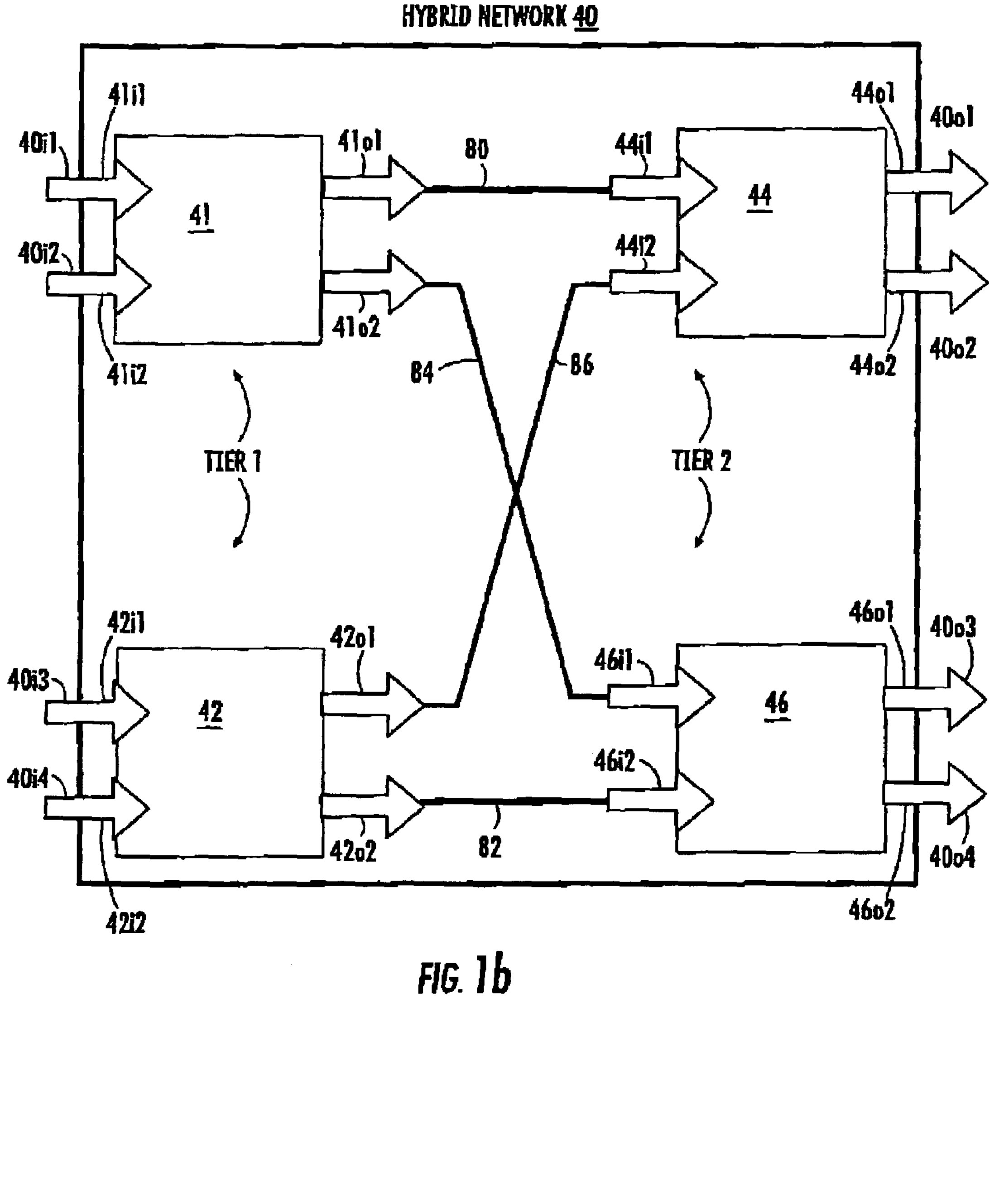
FIG. 1*b* is a more detailed block diagram of the hybrid arrangement of FIG. 1*a;*

FIG. 1*b* illustrates details of the hybrid coupler arrangement 40 of FIG. 1*a*. Hybrid coupler arrangement 40 of FIG. 1*b* includes four 3 dB, 90° hybrids 41, 42, 44, and 46, each including two input and two output ports. More particularly, 3 dB hybrid 41 includes input ports 41*i*1 and 41*i*2 and output ports 41*o*1 and 41*o*2, 3 dB hybrid 42 includes input ports 42*i*1 and 42*i*2 and output ports 42*o*1 and 42*o*2, 3 dB hybrid 44 includes input ports 44*i*1 and 44*i*2 and output ports 44*o*1 and 44*o*2, and 3 dB hybrid 46 includes input ports 46*i*1 and 46*i*2 and output ports 46*o*1 and 46*o*2. Hybrid coupler arrangement 40 input port 40*i*1 communicates with 3 dB hybrid 41 input port 41*i*1, hybrid arrangement 40 input port 40*i*2 communicates with 3 dB hybrid 41 input port 41*i*2, hybrid arrangement 40 input port 40*i*3 communicates with 3 dB hybrid 42 input port 42*i*1, and hybrid arrangement 40 input port 40*i*4 communicates with 3 dB hybrid 42 input port 42*i*2. Similarly, hybrid arrangement 40 output ports 40*o*1, 40*o*2, 40*o*3, and 40*o*4 communicate with 3 dB hybrid output ports 44*o*1, 44*o*2, 46*o*1, and 46*o*2, respectively. A first transmission line 80 within hybrid arrangement 40 connects output port 41*o*1 of 3 dB hybrid 41 to input port 44*i*1 of 3 dB hybrid 44, a transmission line 82 connects output port 42*o*2 of 3 dB hybrid 42 to input port 46*i*2 of 3 dB hybrid 46, a transmission line 86 connects output port 4201 of 3 dB hybrid 42 to input port 44*i*2 of 3 dB hybrid 44, and a transmission line 84 connects output port 41*o*2 of 3 dB hybrid 41 to input port 46*i*1 of 3 dB hybrid 46.

Hybrid 3 dB, 90° couplers, such as hybrid coupler 40 of FIG. 1*a*, are well known in the art, and are described, for example, in U.S. Pat. No. 4,491,871 issued Jan. 1, 1985 in the name of Schmitz et al. and in U.S. Pat. No. 4,602,227 issued Jul. 22, 1986 in the name of Clark et al. The salient properties of 90°, 3 dB hybrid couplers for purposes of signal switching are that signal applied to one input port alone (while the unused ports are terminated in the characteristic impedance) is coupled to only one output port, as for example signal applied to input port 42*i*1 from an operating power amplifier 22 of FIG. 1*a* while power amplifier 28 is inoperative is routed to output port 4201 with 0° relative phase shift and at half power (−3 dB or 0.707 voltage) and to output port 42*o*2 with a −90° relative phase shift, also at half power, and similarly signal applied only at input port 42*i*2 appears at half power at output port 4201 (with a −90° phase shift) and at port 42*o*2 with a 0° phase shift and at half power.

When signal having unity amplitude is applied from both power amplifiers 22 and 24 of FIG. 1*a* to input ports 41*i*1 and 41*i*2, respectively, of 3 dB hybrid 41, and with the same phase, the signals at the output ports 41*o*1 and 41*o*2 of the hybrid arrangement 40 increase in amplitude by 3 dB by comparison with the single-input case, but with somewhat different phase. This may be understood by considering the signals separately. Thus, output port 41*o*1 of 3 dB hybrid 41 receives signal at −3 dB (0.707 relative amplitude) and with a 0° phase shift from the signal applied to input port 41*i*1, and receives signal at −3 dB (0.707 relative amplitude) and with a −90° phase shift from the signal applied to input port 41*i*2. The net signal at output port 41*o*1 is the vector sum of these two signals, which is a relative amplitude of unity (1) at a relative phase of −45°. The signal appearing at output port 41*o*2 of 3 dB hybrid 41 may similarly be determined to be the vector sum of the signal applied to input port 41*i*1 with an amplitude of 0.707 and a phase shift of −90° with the signal applied to input port 41*i*2 with an amplitude of 0.707 and 0° phase shift, which also corresponds to unity amplitude at −45°.

In order to perform switching using a hybrid coupler arrangement such as 40 of FIG. 1*a*, the phase of one of the input signals is changed by +90°. Assuming that the signal applied to hybrid coupler input port 40*i*1 is unity amplitude and 0° or reference phase, and the signal applied to hybrid coupler input port 40*i*2 is unity amplitude, but at +90° relative phase, the vector sum signal at output port 40*o*1 will be the sum of 0.707 at a phase of 0° plus 0.707 at a phase of 0°, which is unity amplitude at 0° phase. Under this same input signal condition, the signal appearing at output port 40*o*2 will be the vector sum of 0.707 at a phase of +90° plus 0.707 at a phase of −90°, which corresponds to zero amplitude or cancels. Under this input phase condition, therefore, hybrid coupler arrangement 40 acts as a switch in a state that couples signals to output port 40*o*1 and not to 40*o*2. If the phase of the input signal applied to input port 40*o*1 is +90° and the phase of the signal applied to input port 40*o*2 is 0°, the signals coupled to port 40*o*1 cancel and the signals coupled to port 40*o*2 add or sum together. The ability of the hybrid coupler arrangement to switch in this manner as a function of phase is well known.

Three-dB hybrids 42, 44, and 46 of FIG. 1*a* are similar to 3 dB hybrid 41, and are similarly capable of switching signals applied to their input ports to output ports, depending upon the relative phases of the applied signals. In the embodiment of this invention, the network 40 of four 3 dB hybrids is connected in such a way the four input ports 40*i*1, 40*i*2, 40*i*3, and 40*i*4 will combine into one of the four output ports 40*o*1, 40*o*2, 40*o*3, or 40*o*4. In this scenario, signals applied to the four input ports with phase relationships of 0°, 90°, 90°, and 180° will result in power being directed to one of the four output ports of hybrid coupler arrangement 40. By changing the four input relationships, energy can be directed to any one of the four outputs.

A set 51 of directional coupler arrangements 52, 54, 56, and 58 is illustrated in FIG. 1*a*. Output port 40*o*1 of hybrid arrangement 40 of FIG. 1*a* is coupled by way of a directional coupler arrangement 52 of set 51 and by way of a transmission path 53 to array antenna 14*a* of structure 14. Output port 40*o*2 of hybrid arrangement 40 is coupled by way of a directional coupler arrangement 54 of set 51 and by way of a transmission path 55 to antenna 14*b* of structure 14. Similarly, output ports 40*o*3 and 40*o*4 of hybrid arrangement 40 are coupled by directional coupler arrangements 56 and 58 of set 51 and transmission paths 57 and 59, respectively, to array antennas (not illustrated) associated with other faces of structure 14.

Radar system controller 12 of FIG. 1*a* produces radio-frequency (RF) carrier signal at the desired transmission frequency, which may change from time to time or from transmitted pulse to transmitted pulse. The RF signal produced by computer 12 is coupled to an input port 60*i* power splitter arrangement illustrated as a block 60. Block 60 divides the signal into four portions of equal amplitude, which appear at output ports 60*o*1, 60*o*2, 60*o*3, and d60*o*4. The RF signal from splitter output port 6001 is coupled by way of a directional coupler arrangement 62 of a set 61 of directional coupler arrangements to an input port 23*i* of controllable phase shifter (ΔΦ) 23, RF signal from splitter output port 60*o*2 is coupled by way of a directional coupler arrangement 64 to an input port 25*i* of controllable phase shifter (ΔΦ) 25, RF signal from splitter output port 60*o*3 is coupled by way of a directional coupler arrangement 66 to an input port 27*i* of controllable phase shifter (AO) 27, and RF signal from splitter output port 60*o*4 is coupled by way of a directional coupler arrangement 68 to an input port 29*i* of controllable phase shifter (ΔΦ) 29. Thus, each combination of power amplifier or transmitter 22, 24, 26, and 28 with phase shifter 23, 25, 27, and 29, respectively, is fed with RF having the same nominal phase.

In FIG. 1*a*, each directional coupler arrangement 32, 34, 36, 38, 52, 54, 56, 58, 62, 64, 66, and 68 is capable of producing samples of the signal power flowing in each direction along the transmission line or path with which it is associated. This may be accomplished, as illustrated, with individual directional couplers oriented for response to incident power and reflected power, or it may be accomplished, as known, by the use of single bidirectional couplers.

More particularly, in FIG. 1*a*, directional coupler arrangement 32 includes two individual directional couplers designated 32*i* and 32*r*, oriented in the associated transmission line or path to respond to incident (i) and reflected (R) power, respectively. The sample of the incident power becomes available at an output port, designated 32*io*, of directional coupler 32*i*, and the sample of reflected power becomes available at an output port, designated 32*ro*, of directional coupler 32*r*. Similarly, samples of incident power appear at output ports 34*io*, 36*io*, and 38*io* of directional couplers 34*i*, 36*i*, and 38*i*, and samples of reflected power appear at output ports 34*ro*, 36*ro*, and 38*ro*, respectively, of directional couplers 34, 36, and 38. The samples of reflected power are coupled to input ports of a multiplexer (MPX) 70. The relative amplitude or magnitude of the signal sample produced by a directional coupler is determined by its design; 20 dB (1/100$^{th}$ power) samplers are common, but they may have any sampling ratio. It should be noted that the sampled power level reduces the power available on the transmission line or path with which the coupler is associated, so a 20 dB coupler would introduce a 10% power loss in the main signal path, corresponding to slightly less than 0.5 dB.

Directional coupler arrangements 52, 54, 56, and 58 as illustrated in FIG. 1*a* include incident-power sensing directional couplers 52*i*, 54*i*, 56*i*, and 58*i*, which couple samples of the incident signals by way of their output ports 52*io*, 54*io*, 56*io*, and 58*io*, respectively, to input ports of multiplexer 70. Directional coupler arrangements 52, 54, 56, and 58 as illustrated also include reflected-power sensing directional couplers 52*r*, 54*r*, 56*r*, and 58*r*, which couple samples of the incident signals by way of their output ports 52*ro*, 54*ro*, 56*ro*, and 58*ro*, respectively, to input ports of multiplexer 70. Further, directional coupler arrangements 62, 64, 66, and 68 as illustrated in FIG. 1*a* include incident-power sensing directional couplers 62*i*, 64*i*, 66*i*, and 68*i*, which couple samples of the incident signals by way of their output ports 62*io*, 64*io*, 66*io*, and 68*io*, respectively, to input ports of multiplexer 70. Directional coupler arrangements 62, 64, 66, and 68 as illustrated also include reflected-power sensing directional couplers 62*r*, 64*r*, 66*r*, and 68*r*, which couple samples of the incident signals by way of their output ports 62*ro*, 64*ro*, 66*ro*, and 68*ro*, respectively, to input ports of multiplexer 70.

Multiplexer 70 of FIG. 1*a* is controlled by a transmitter control computer 72 for selectively sampling the signal sample from the output port of one of the directional couplers, and for coupling the selected sample to a power measuring device or meter 74. For each signal sample coupled to power meter 74, the power meter produces digital signals representing the measured amount of power. Depending upon whether an incident-power or a reflected-power directional coupler is coupled to the power meter, the resulting measure of power is indicative of incident or reflected power in the associated transmission line or transmission path.

In addition to controlling multiplexer 70 of FIG. 1*a*, transmitter control computer 72 controls the states of the controllable phase shifters (ΔΦ) 23, 25, 27, and 29. More particularly, transmitter control computer 72 performs a "feedback" calibration to optimize the power throughput (maximize efficiency) of the power-amplifier/hybrid combination in each operating mode and at each potential selected frequency of operation, and stores the phase shifts to which the phase shifters 23, 25, 27, and 29 must be set to achieve that optimum.

The inventors herein recognized that the traditional method for operating a hybrid coupler arrangement for port switching operation is subject to undesirable mismatch and other bandwidth-related losses in broadband applications. According to an aspect of the invention, the stored phase-shifter information resulting from the feedback calibration is used for "feedforward" control of the phase applied to the hybrid coupler arrangement at each operating frequency. As mentioned, the operating frequency may change from pulse to pulse, and the feedforward phase correction required to optimize the efficiency of the hybrid switching is also changed from pulse to pulse, so that the hybrid coupling arrangement tends to always have a null at one of its output ports, with the concomitant that the power coupled to the other of the output ports is at a maximum.

In operation of the system of FIG. 1*a*, the overall operation of the system is under the control of radar system control computer 12, which (pursuant to human commands) selects the antenna array from among arrays 14*a*, 14*b*, . . . that one array which is to transmit the next following pulse, and also sends beam direction control commands by way of a path 76 to at least the selected one of the antenna arrays to select the beam direction for the next following pulse(s). The selected antenna information is also provided by way of a data path 77 to transmitter control computer 72, so that it may command the phases of the pulse signals which are applied to the input ports of hybrid coupling arrangement 40 to steer the power to the selected one of the antenna arrays. Additionally, radar system control computer 12 also sends by way of a path 78 to transmitter control computer 72 data relating to the frequency of the next pulse, so that computer 72 may select the optimal or most efficient power transfer phases for the selected frequency.

Figure 2:
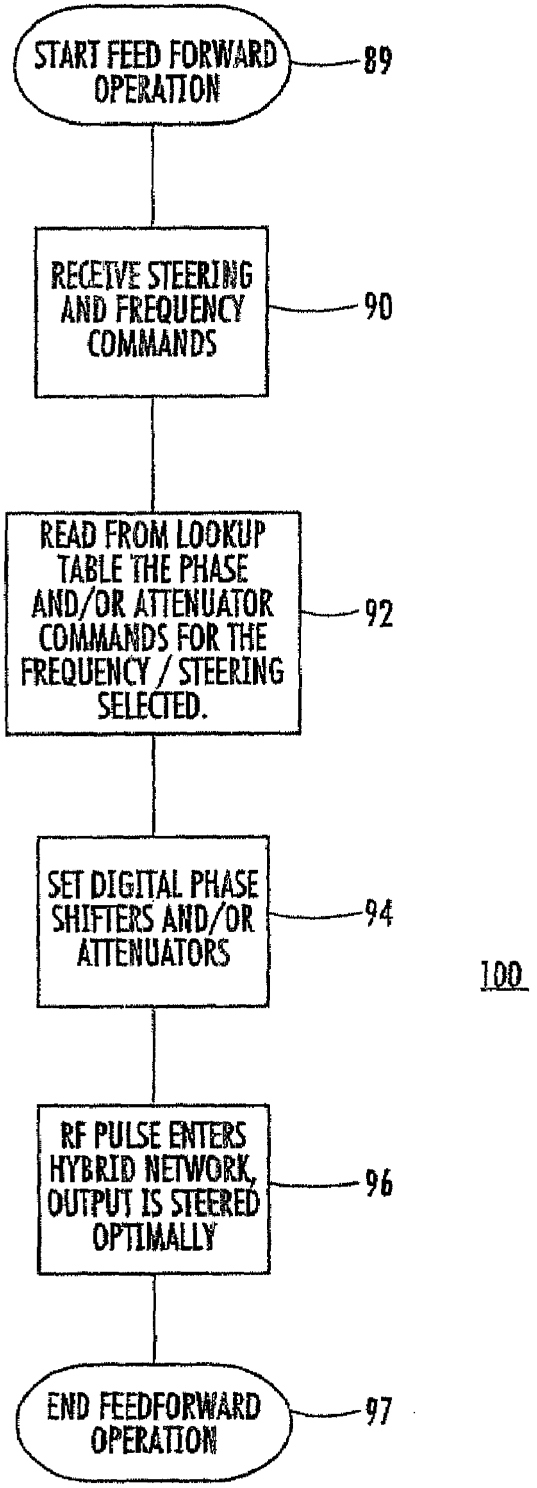
FIG. 2 is a simplified logic flow chart or diagram illustrating the overall feedforward operation of the arrangement of FIG. 1*a;*

FIG. 2 is a simplified logic diagram illustrating the overall logic flow 100 for control of the arrangement of FIG. 1*a* for feedforward operation. In FIG. 2, the feedforward operation logic starts at a START block 89 and flows to a block 90, which represents receipt of antenna steering and operating frequency commands from computer 12 of FIG. 1*a*. These commands include beam direction control commands-transmitted over path 76 of FIG. 1*a*, frequency data transmitted over path 77, the antenna selection commands transmitted over path 78. From block 90, the logic flows to a block 92, which represents the reading by computer 72 (FIG. 1*a*) of the phase andor attenuator settings appropriate for the antenna selection and pulse frequency, and the appropriate control of the settings by way of the ΔΦ path. Block 94 of FIG. 2 represents the actual setting of the phase shifters and attenuators. Naturally, the RF pulse should not be transmitted until the phase and possibly amplitude settings have been made and the phases are stabilized. Block 96 represents the transmission of the actual RF pulse over path 75. The logic ends at a block 97. The logic of FIG. 2 repeats for each transmitted pulse.

Figure 3:
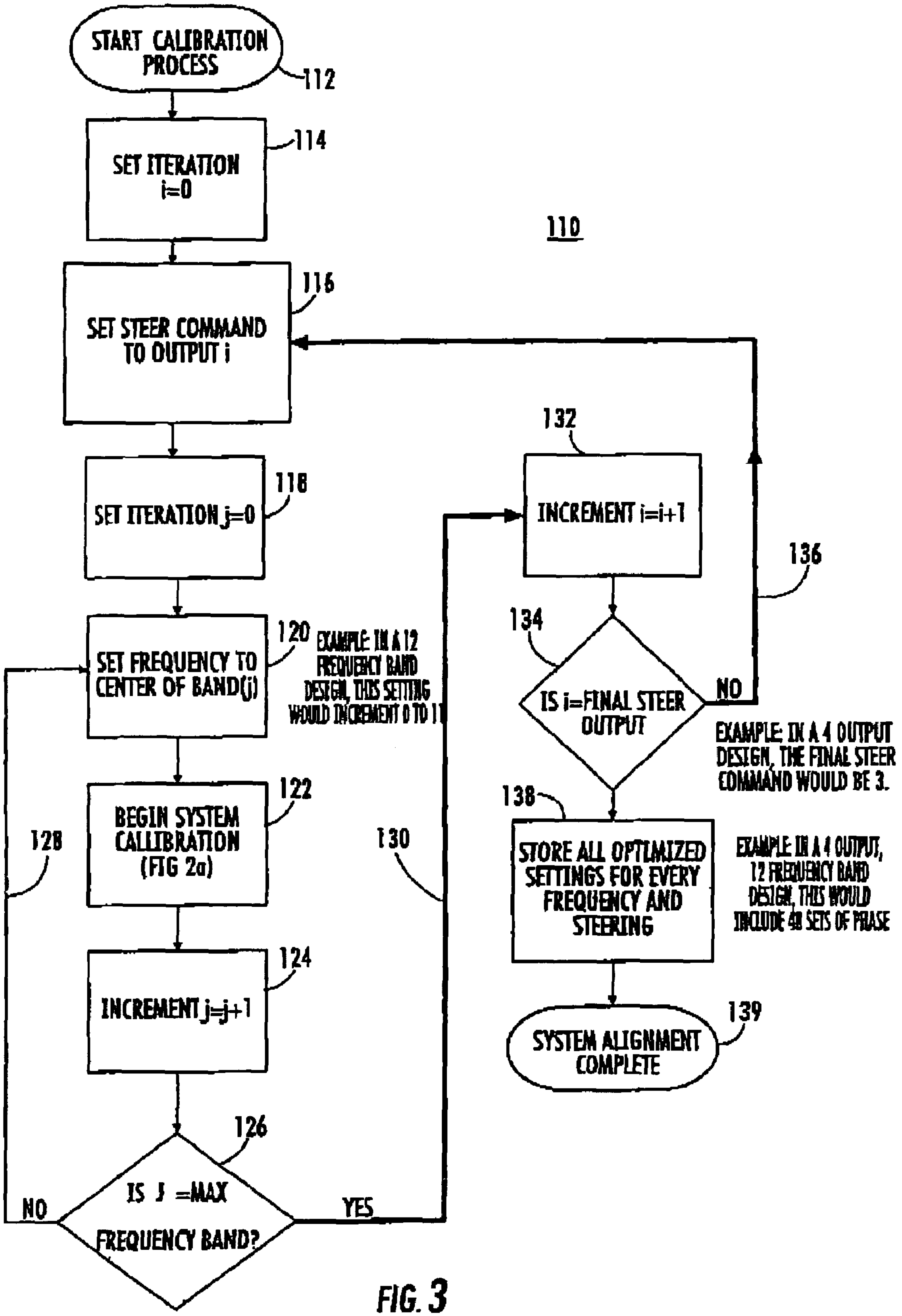
FIG. 3 is a simplified logic flow chart or diagram illustrating the overall feedback mode calibration of phase andor amplitude to produce stored information.

FIG. 3 is a simplified overall logic flow diagram or chart illustrating the logic flow 110 associated with calibration of steering and frequency commands. In FIG. 3, the logic begins at a Start Calibration Processblock 112, and flows to a block 114, representing the setting of an iteration variable i to a value of 0, so that i=0. From block 114, the logic flows to a further block 116, which represents the setting of the steering command to a first of four values, such as 0, representing the steering of the signal to antenna 14*a* of FIG. 1*a*. In a system with four antennas, as illustrated in FIG. 1*a*, the four values might be 0, 1, 2, and 3. From logic block 116, the logic flows to a block 118, which represents the setting of an iteration variable j to a value of 0, so that j=0. Block 120 represents the setting of the frequency to the center of band j. From block 120, the logic flows to a block 122, which represents the beginning of the system calibration for the selected frequency and steering. Details of the system calibration are illustrated in conjunction with FIG. 4*a*. From block 122, the logic flows to a block 124, which represents the incrementing of variable j=j+1, indicating that the system calibration for this frequency and steering is complete. From block 124, the logic flows to a decision block 126, which determines if iteration variable j has reached the maximum frequency band value of j=max. If the logic has not reached the maximum value of j, meaning that all the frequencies and steering combinations have not been calibrated, the logic leaves decision block 126 by the NO output, and returns by a logic path 128 to block 120, representing the setting of the frequency to the center of band j. The logic iterates around the loop including blocks 120, 122, 124, 126, and path 128 until all frequencies have been calibrated for the value of steering determined by the current value of iteration variable i.

Once all the frequencies have been calibrated for the current value of steering commands identified by the current value of iteration variable i, the logic leaves decision block 126 of FIG. 3 by the YES output, and proceeds by way of a logic path 130 to a block 132, representing incrementing of steering command variable to a value of i=i+1. From block 132, the logic flows to a decision block 134, which determines if all the steering possibilities have been exhausted by determining if steering variable i is the final steering variable. As mentioned, for steering to one of four outputs, i can take on values of 0, 1, 2, or 3. If more steering values remain to be calibrated, which is to say that in this example the value of i is less than 3, the logic leaves decision block 134 by the NO output, and proceeds by way of a logic path 136 back to block 116, where the steering command is set to the new current value of i. If calibration has been performed for all possible values of steering, the logic leaves decision block 134 by way of the YES output, and proceeds to a block 138, which represents the storage of the optimized phases (and attenuation or gain, if appropriate) for all the steering and frequency values, if not already stored during the calibration.

Figure 4A:
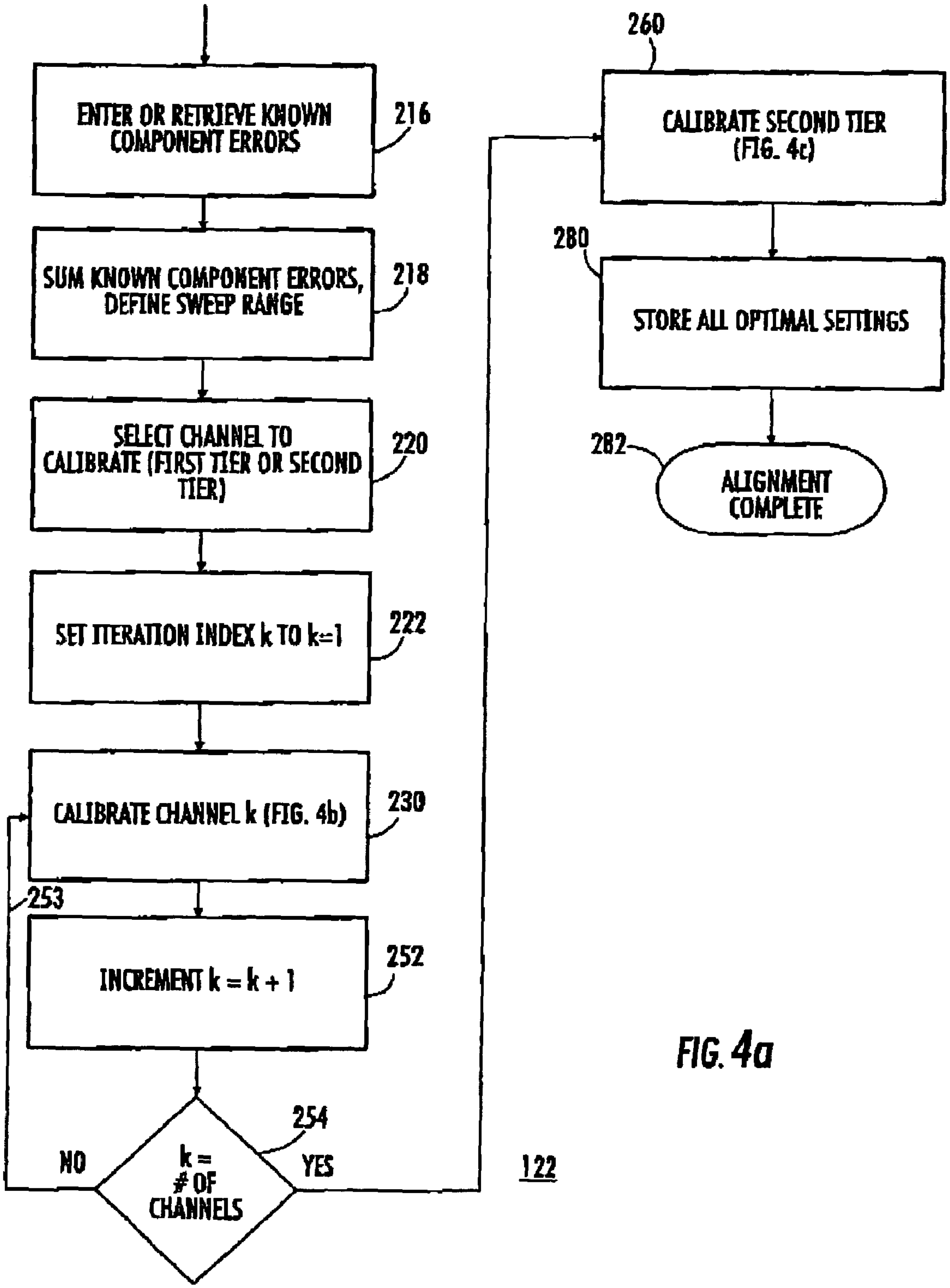
FIG. 4*a* is a simplified logic flow chart or diagram illustrating details of the optimizing alignment of FIG. 3, and FIGS. 4*b* and 4*c* are simplified flow charts or diagrams illustrating details of the flow chart of FIG. 4*a*.

The phase error for the system must be determined to optimize the calibration process. This error is dependent upon the RF frequency and steering (hybrid network output ports 44*o*, 46*o*). FIG. 4*a* is a simplified logic diagram or chart illustrating details of the logic of block 122 of FIG. 3. The process described in conjunction with FIG. 4*a* must be completed for each frequency and steering command which is to be used. For example, if the system has four hybrid network output ports, and twelve operating frequencies, the calibration loop must be run forty-eight times. From logic block 120 of FIG. 3, the logic flows to a block 216 of FIG. 4*a*. Block 216 represents retrieval of stored information relating to entry of the known phase errors as a function of frequency of each relevant component, such as the phase errors between the output ports 60*o*1, 60*o*2, 60*o*3, and 60*o*4 of power splitter 60 of FIG. 1*a*, the phase errors attributable to signal flow through the directional coupler sets 31 and 62, and the phase errors attributable to differential phase propagation through power amplifiers or transmitters 20*a* and 20*b*. If these phase errors have been previously entered, block 216 represents retrieval of such information. Block 218 represents the summing of the known phase errors for each signal path of interest, and the storing of such information, at least temporarily. Once all the component phase error margins have been entered, the logic can proceed to the next step, represented by block 218. The phase errors for the signal paths are then summed, to determine the phase sweep range required for successful alignment. Sweeping in this context corresponds to that used in RF test methods. Devices such as RF sweepers perform this task. Block 218 represents summation of the known component errors, together with other errors, if appropriate. Phase errors of the system's components are used to define the range the phase shifters must be swept. As an example, if the system has a total of ±20° of phase error, the phase shifters during calibration must be swept ±20° of the ideal phase setting (if the ideal phase is 90°, the sweep would start at 70° and continue through to 110°).

From block 218, the logic of FIG. 4*a* flows to a block 220, which represents selection of the tier of hybrid arrangement 40 to be calibrated. The first tier of hybrid arrangement 40 includes 3 dB hybrids 41 and 42 of FIG. 1*b*, and the second tier includes 3 dB hybrids 44 and 46. Three-dB hybrids 40 and 42 are calibrated to focus or translate power to either 3 dB hybrids 44 or 46. Three-dB hybrids 44 and 46 are then calibrated to focus or transfer power out of ports 44*o*1, 44*o*2, 46*o*1, or 46*o*2 of FIG. 1*b*. With the same amount of phase steering, power can be combined to any output port. The first tier 40, 42 of 3 dB hybrids of FIG. 2*b* must be calibrated first, followed by the second tier of 3 dB hybrids 44, 46. The step associated with block 220 selects which tier is under calibration, with guards to protect against calibrating in the wrong order.

Once the channel to be aligned has been selected by block 220, the logic of FIG. 4*a* flows to a block 222, which represents the setting of an iteration variable k to unity (k=1), for the beginning of the first iteration of alignment. For first tier operation, this moves by one phase increment a single phase shifter on a single tier one 3 dB hybrid. The logic then flows to a block 230, representing the performance of calibration of the selected channel, as described in more detail in conjunction with FIG. 4*b*. In calibration of a single channel, a single-phase shifter on each hybrid coupler arrangement is swept through the ideal phase setting range as determined in block 218, to find the optimal isolation of that hybrid coupler arrangement. In this context, isolation by definition is the power "delta" from a defined output port to another output port. The iteration number will equal the number of first tier 3 dB hybrids. From block 230, the logic flows to a block 252, which represents the incrementing of the iteration variable k to k+1, for incrementing to the next 3 dB hybrid on the first tier. As an example, after recording optimized first tier data from 3 dB hybrid 41, k is incremented and calibration of 3 dB hybrid 42 starts. From block 252, the logic flows to a further decision block 254, which determines if the calibration is complete by comparing the iteration variable k with the total number of channels to be aligned in order to either move to second tier 3 dB hybrid calibration or to continue on with first tier calibration. If the iteration variable k is not equal to the number of channels which are available to be aligned, the logic leaves decision block 254 by the NO output, and proceeds by a path 253 back to block 230, to begin calibration of the next channel k. If the channel calibrations are complete, the logic leaves decision block 254 by the YES path, and proceeds to a block 260.

Figure 4B:
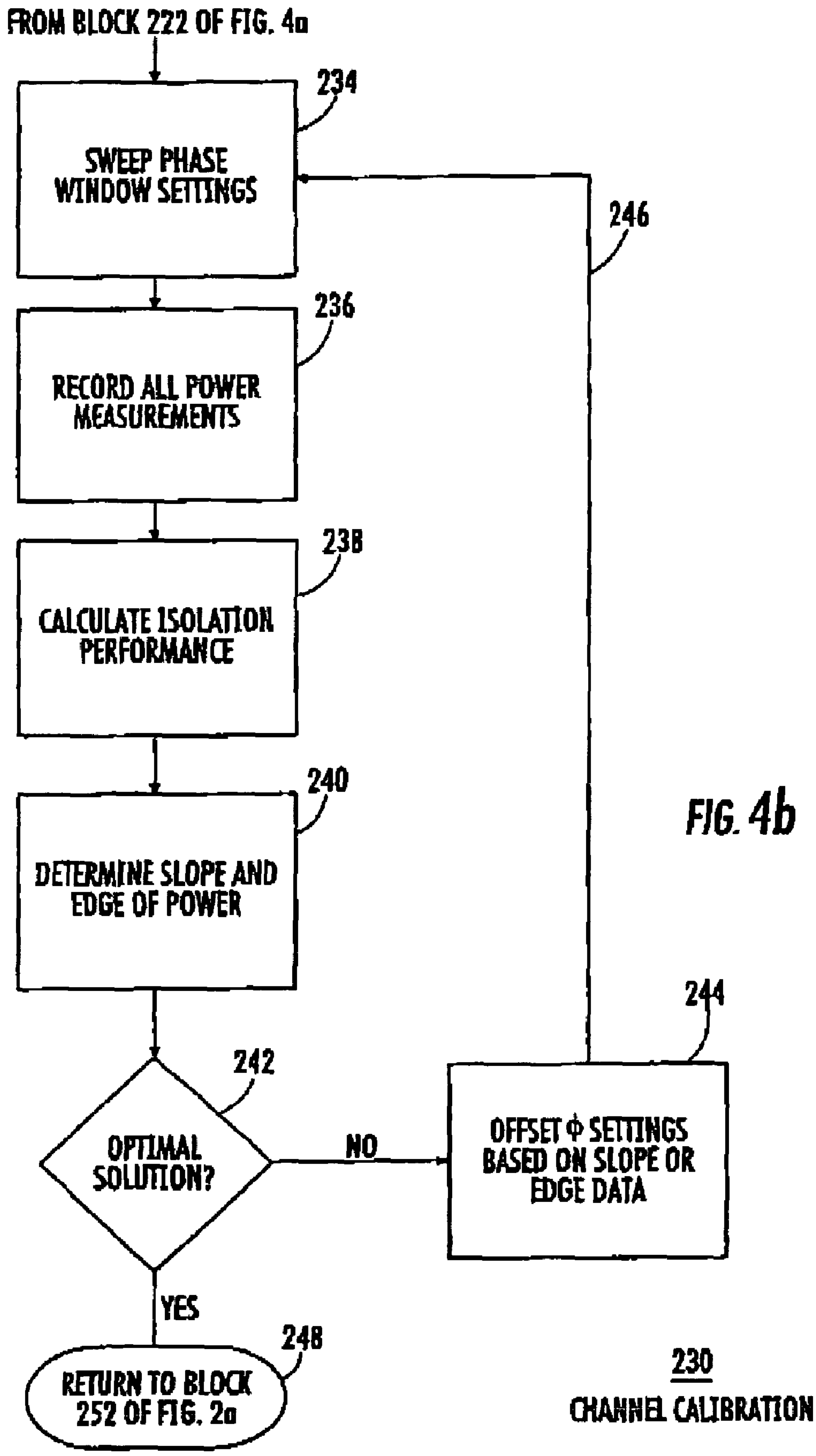
FIG. 4*d* is a simplified flow diagram of the aspect of the invention described in conjunction with FIG. 4*c* for a particular example.
Figure 4C:
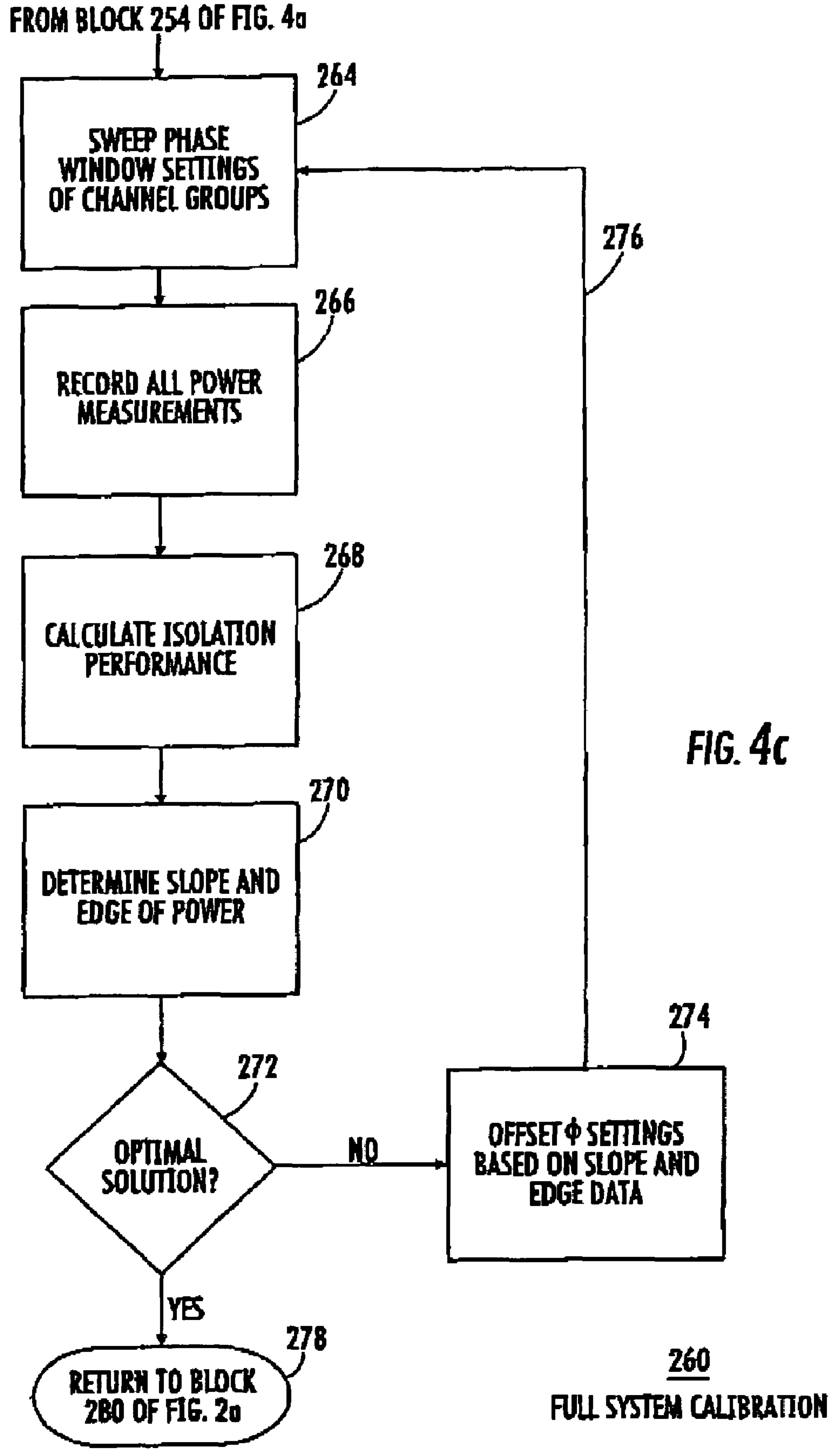

Block 260 of FIG. 4*a* represents calibration of the second tier, as described in more detail in conjunction with FIG. 4*c*. This step requires that the first tier of 3 dB hybrids already be calibrated. In order to calibrate second tier 3 dB hybrids, without direct access to their input ports 44*ix*, 46*ix* (FIG. 1*b*), the first tier 3 dB hybrids must be directed to steer to each second-tier 3 dB hybrid in sequence. In the quad hybrid network configuration 40 of FIG. 1*b*, 3 dB hybrids 41 and 42 are sent phase commands to steer their output signals to hybrid 44. The relative phase delta (Δ) or difference between 3 dB hybrids 41 and 42 is adjusted (which requires simultaneous adjustment of two phase shifters) through the phase sweep window, and optimal settings are selected. When the second tier calibration is complete, the logic of FIG. 4*a* proceeds to a block 280, which represents the storage in high-speed look-up table or memory of all the optimum calibration phase values and other settings for each channel and frequency, if not already stored. Settings may include all phase shifter settings, attenuator settings and RF switch positions. These values are then available for use during the feed-forward operation of FIG. 2. From block 280 of FIG. 4*a*, the logic flows to an ALIGNMENT COMPLETE block 282, from which the logic can begin feedforward operation as described in conjunction with FIG. 2.

FIG. 4*b* illustrates details of block 230 of FIG. 4*a*. In FIG. 4*b*, the logic arrives at a block 234 from block 222 of FIG. 4*a*. The error calculated/estimated/generated in block 218 defines the sweep range, and block 234 essentially inputs this information into the phase shifters. Block 234 represents the sweeping of phase window settings. Sweep phase window settings can also be described as sweep phase settings over a range defined by the error margin of the system. That is, if the potential phase error of the system is ±20°, and if the desired system setting is 90°, the sweep would start at 70° and end at 110°. When the sweeping represented by block 234 is completed, the logic proceeds to a block 236, which represents the capturing and recording in memory, at least temporarily, of the power measurements derived or produced during the previous sweep, as for example at ports 42*o*1, 42*o*2, 44*o*1, 44*o*2 of FIG. 1*b*. From block 236, the logic of FIG. 4*b* flows to a block 238, which represents calculation of isolation based upon first-tier-only adjustment. For example, while sweeping hybrid combiner arrangement 40, shifting only the phase of phase shifter 23 at input port 40*i*1 and holding constant the phase shifts of phase shifters 25, 27, and 29 at input ports 40*i*2, 42*i*1, and 42*i*2, the power through or from the output ports 400 of hybrid coupler arrangement 40 can be tuned for optimal isolation by adjustment of the outputs of the 3 dB hybrid 41 versus the 3 dB hybrids output 44*o*, then tuned for optimal isolation versus the 3 dB hybrids output 46*o* output (two sets of phase settings). As mentioned, isolation by definition is the power difference or "delta" (Δ) from a defined output port to another output port. The calculation may be illustrated by noting that the isolation I between ports 400 and 420 is I=(power P40*o*−power P42*o*). During a phase sweep, this would "look" like a bell curve, with the peak the optimal solution, all as known in the art.

The slope and edge of the power information is determined in block 240 of FIG. 4*b*. In the case a null is not achieved (optimal isolation). While it is possible to include logic to identify a failure in the system, the simplified alignment logic does not include such a feature as being without the scope of the invention, but instead assumes that a null will always be achieved. Hybrids all have isolation specifications, and the duty of the algorithm is to maximize this isolation performance. All working setups must have a maximum, and the maximum must also meet specifications of the hybrid minus system error (two variables accounted for in the flow). The slope and edge detector data generates information relating to the isolation, and determines if more or less phase offset (higher or lower phase values) must be used for the next iteration. From block 240, the logic flows to a decision block 242. Decision block 242 determines if the current solution is optimal using peak detection of the "non-steered" outputs (those output ports of 3 dB hybrids to which signal is not steered, which is to say nominally null output ports), and comparing those peak-detected output signals with the isolation specification of the hybrid coupler arrangement or network 40. That is to say, if the 3 dB hybrids are capable of 20 db of isolation, any isolation peaks exceeding 20 db are considered to be optimal. This optimization resolves phase steering for tier 1 of the hybrid network 40, or in other words establishes that the measurements identify the real isolation maximum, rather than a noise peak or reading error that appears as a momentary or local peak. If the isolation peak meets or exceeds the hybrid specification, the peak is deemed to be real. Block 242 thus determines if a null has been achieved, and if the power isolation requirements are met. If block 242 determines that a null has been achieved, the first tier 3 dB hybrids is deemed to have been tuned or aligned, and the logic proceeds to a block 248, representing continuation by return to block 252 of FIG. 4*a* to the next first-tier 3 dB hybrid or to begin second-tier calibration. On the other hand, if block 242 determines that a null or optimal solution has not been reached, the logic leaves decision block 242 by the NO output, and proceeds to a logic block 244. Logic block 244 represents offsetting the phase (Φ) settings based on the slope or edge data from block 240. From block 244, the logic returns by way of a logic path 246 back to block 234, to begin another sweep. As an example, assuming that the prior phase sweep was over the range of 70° to 110°, and the offset was calculated to be 30°, the next sweep would be 100° to 140°.

The logic of block 260 of FIG. 4*a* is detailed in FIG. 4*c*. Block 280, and the logic of FIG. 4*c*, represents calibration of the second tier of 3 dB hybrids of FIG. 1*b*. In FIG. 4*c*, the logic flows from decision block 254 of FIG. 4*a* to a block 264, which represents the sweeping of phase window settings of channel groups consisting of both channels of a 3 dB hybrid input port 41*i*1, 41*i*2 or 42*i*1, 42*i*2 of FIG. 1*b*. That is, block 264 represents the changing of phase settings for both input ports of a 3 dB hybrid simultaneously or at the same time. As an example, if the phase settings on ports 41*i*1 and 41*i*2 are variables M° and N°, respectively, and the phase sweep is ±20°, port 41*i*1 starts at M−20°, and port 41*i*2 is set to N−20°, then incremented one phase bit higher. If phase Shifter 1 is at phase setting M and Phase Shifter 2 is at phase setting N, and if the phase window is +−20 degrees, this function may be imagined as a 40-iteration loop that increments M and N by one on each iteration, until phase shifters 1 and 2 reach M+20° and N+20°, respectively. If ideal steering to 3 dB hybrid 44 from 3 dB hybrids 41 and 42 requires W° relative phase on port 41*i*1, X° relative phase at port 41*i*2, Y° relative phase at port 42*i*1, and Z° at port 42*i*2, then the ideal phase input would be W, X, Y, Z at hybrid inputs 41*i*1, 41*i*2, 42*i*1, 42*i*2. The input phase settings of the first hybrid 41 must be incremented during the phase One 3 dB hybrid must be changed leaving the other constant, sweeping 40*i* from W−20°, X−20° to W+20°, X+20° assuming a +−20° error window. Three-dB hybrid 41 would change phase relative to 42, which would effectively change phase on one input 44*i*1 of 3 dB hybrid 44.

Figure 4D:
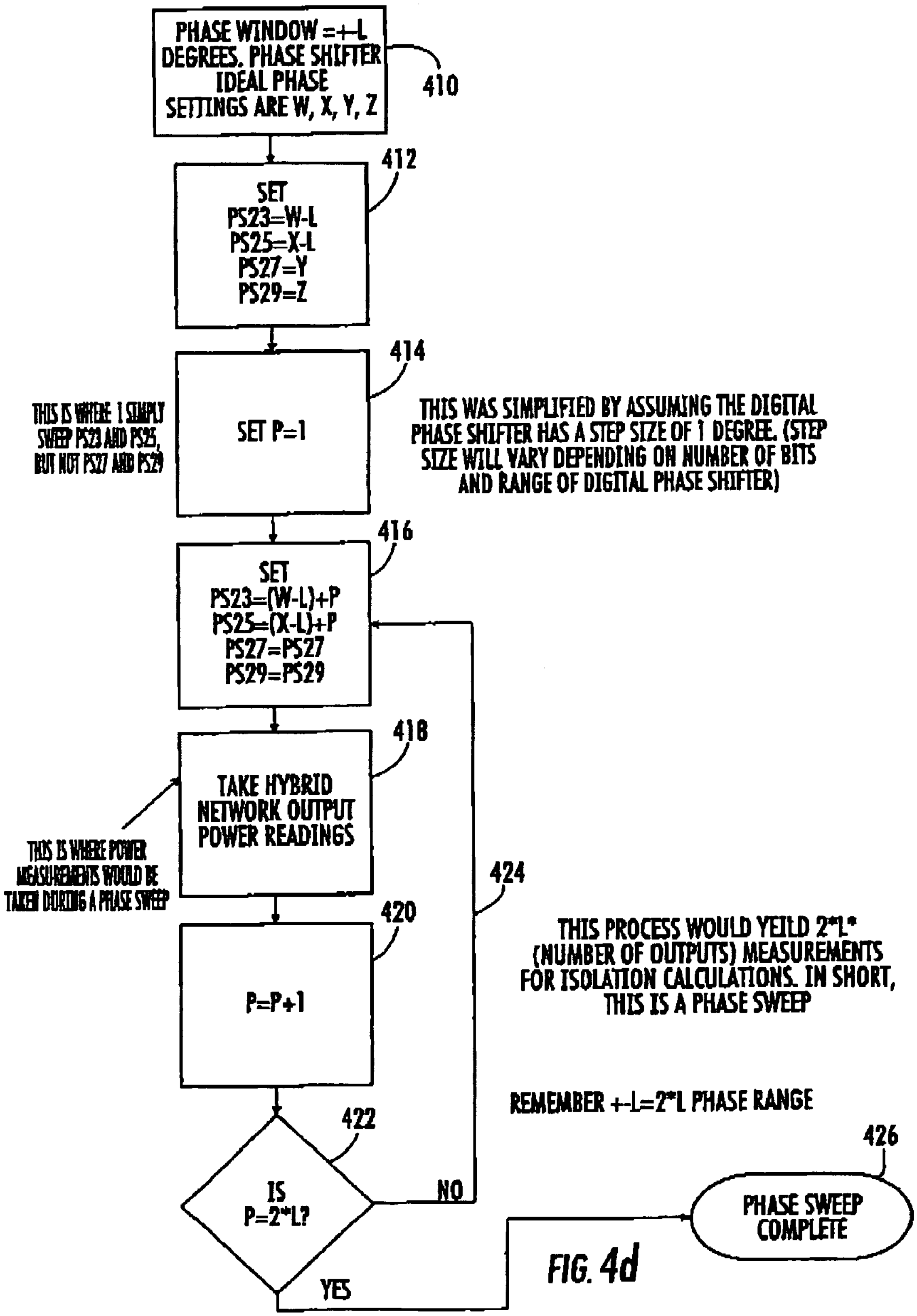

FIG. 4*d* is a simplified flow diagram of the aspect of the invention described in conjunction with FIG. 4*c* for a particular example. In the description of FIG. 4*d*, phase shifters of FIG. 1*a* are designated PS23, PS25, PS27, and PS29, and the assumed phase increments are 1°. The flow begins at a block 410, representing the initial conditions of phase window ±L degrees, and phase shifter ideal phase settings of W, X, Y, and Z. Block 412 represents the setting of PS23 to W-L, PS25 to X-L, PS27 to Y, and PS29 to Z. Block 414 represents the setting of phase increment P=1°. The loop including blocks 416, 418, 420, decision block 422, and path 424 simply sweeps the phase of PS23 and PS25, but not of PS27 and PS29. Block 416 represents the setting of PS23 to (W−L)+P, the setting of PS25 to (X−L)+P, and no change to PS27 and PS29. Block 418 represents the measurement of power at the output ports 40*o*1, 40*o*2, 40*o*3, and 40*o*4 of the hybrid coupler arrangement 40. Block 420 represents the setting of the phase P to P+1. Decision block 422 determines if the current value of P equals 2L (this is because ±L is a range of 2*L). If the current value of P is less than 2L, the flow returns by a path 424 to block 416, where the values of PS23 and PS25 (but not PS27 or PS29) are set to the phase value represented by (W−L)+P and (X−L)+P, respectively, for the next iteration. Of course, when decision block 422 determines that the phase sweep has incremented over the range +L, the logic leaves decision block 422 by the YES output and flows to the PHASE SWEEP COMPLETE block 426.

From block 264 of FIG. 4*c*, the logic flows to a block 266, representing recording, at least temporarily, of the power measurements resulting from the sweep performed by block 264. This step may be performed by peak power meters hooked to couplers, crystal detectors, or other means. From block 264, the logic proceeds to a block 268, which determines isolation performance of the second tier of 3 dB hybrids. The isolation calculations look at or determine the actual power output of the complete hybrid coupler arrangement 40 of FIGS. 1*a* and 1*b*. Once the isolation is established in block 268, the logic of FIG. 4*c* flows to a block 270, which represents the determination of slope and edge of the power, in a manner similar to that described in conjunction with block 240 of FIG. 4*b*. In the case that a null is not achieved (optimal isolation), the edge detector and slope of the isolation data allows determination of whether higher or lower phase values must be used, allowing creation of an offset for the next iteration. From block 270 of FIG. 4*c*, the logic flows to a decision block 272, which determines if the solution is optimal, in a manner similar to that described in conjunction with block 242 of FIG. 4*b*. If the solution is optimal, the routine of FIG. 4*c* ends, and the logic returns by way of a RETURN block 278 to block 280 of FIG. 4*c*. If the solution is not optimal, the logic leaves decision block 272 by the NO output, and proceeds to a block 274. Block 274 represents the offsetting of phase settings based on the slope and edge data, in a manner similar to that described in conjunction with block 244 of FIG. 4*b*. The offset must be added to both phase settings of the first tier 3 dB hybrid being swept. From block 274, the logic returns by way of a logic path 276 to block 264. For example, assuming the previous or prior phase sweep was 700 to 1100, and the offset was calculated to be 30°, the next sweep will be 100° to 140°.

A method according to an aspect of the invention, for transmitting pulsed radar signals from any one of a plurality of antenna arrangements (14*a*, 14*b*, . . . ), comprises the step of from time to time, generating signals, such as pulses, from a plurality (four) of signal sources (22, 24, 26, 28). The pulses may be at various frequencies. The signals from the plurality of sources (22, 24, 26, 28) are applied to a like plurality of input ports (40*i*1, 40*i*2, 40*i*3, 40*i*4) of a multiport hybrid coupler network (40). The multiport hybrid network (40) includes a second plurality (four) of output ports (40*o*1, 40*o*2, 40*o*3, 40*o*4), which second plurality (four) may be equal to the first plurality (four). In one embodiment of the invention, the multiport hybrid network (40) has eight ports, four of which are used as input ports and four of which are used as output ports. The multiport hybrid network (40) couples signals applied to its input ports to (or among) selected ones of the output ports (40*o*1, 40*o*2, 40*o*3, 40*o*4) in response to the relative phase relationship between or among the signals applied to the input ports (40*i*1, 40*i*2, 40*i*3, 40*i*4). The signals appearing at the output ports (40*o*1, 40*o*2, 40*o*3, 40*o*4) of the multiport hybrid arrangement (40) are coupled to a plurality of antenna arrangements (14*a*, 14*b*, 14*c*, 14*d*). A phase alignment control arrangement (72) is coupled to the sources (22, 24, 26, 28), and to the output ports (40*o*1, 40*o*2, 40*o*3, 40*o*4) of the hybrid network (40), and it is operated in a phase alignment mode (122) for determining the relative phase relationships among the signals applied to the input ports (40*i*1, 40*i*2, 42*i*1, 42*i*2) of the hybrid arrangement (40) which are required to optimize the signal amplitude applied to a selected combination of the antenna arrangements (14*a*, 14*b*, . . . ) at the frequency of the signal from the sources (22, 24, 26, 28), and for storing phase information relating to the optimum signal amplitude. In one advantageous embodiment, there are four antenna arrangements (14*a*, 14*b*, . . . ) coupled to the four output ports (40*o*1, 40*o*2, 40*o*3, 40*o*4) of an eight-port hybrid network (40), and the phase information required for optimizing the switching of the signals to one or the other of the antenna arrangements (14*a*, 14*b*, . . . ) is stored. An operational control arrangement (12) is coupled to the sources (22, 24, 26, 28) and to the phase alignment control (72) arrangement. The operational control arrangement (12) is operated for selecting operational frequencies for the signal sources (22, 24, 26, 28) and the destination antenna (14*a*, 14*b*, . . . ) of the signals from the signal sources (22, 24, 26, 28). The phase of the signals applied from the sources (22, 24, 26, 28) to the input ports (40*i*1, 40*i*2, 40*i*3, 40*i*4) of the hybrid arrangement (40) is adjusted in response to the stored phase information and the commanded operational frequency and destination antenna (14*a*, 14*b*, . . . ) to optimize the coupling to one of the antenna arrangements (14*a*, 14*b*, . . . ) and to optimize the power null for the other antenna arrangement.

A method according to another aspect of the invention is for aligning a radar system which uses phase-controlled steering of signals in a multitier hybrid arrangement (40) including plural input ports (40*i*1, 40*i*2, 40*i*3, 40*i*4) and plural output ports (40*o*1, 40*o*2, 40*o*3, 40*o*4). The method comprises the steps of selecting an operating frequency for transmission, and applying signal at the operating frequency to at the plural of input ports (40*i*1, 40*i*2, 40*i*3, 40*i*4) to thereby define or produce applied signals. The relative phase shift of the applied signals is stepped through a range of values while monitoring the power appearing at the plural output ports (40*o*1, 40*o*2, 40*o*3, 40*o*4), and the power and the associated ones of the relative phase shift values are stored. The steps of selecting and applying for a plurality of operating frequencies are repeated, to thereby generate a database of output power as a function of frequency and relative phase shift.

A method according to another aspect of the invention for operating a radar system (10) which uses phase-controlled steering of signals in a multitier arrangement (40) including plural input ports (40*i*1, 40*i*2, 40*i*3, 40*i*4) and plural output ports (40*o*1, 40*o*2, 40*o*3, 40*o*4) comprises the steps of selecting a plurality of potential operating frequencies for transmission, and aligning the radar system (10). Alignment of the radar system (10) is accomplished by the steps of (a) applying signal at one of the operating frequencies to the plural input ports (40*i*1, 40*i*2, 40*i*3, 40*i*4), to thereby define or produce applied signals;

(b) stepping the relative phase shift of the applied signals at the one of the operating frequencies while monitoring the power appearing at the plural output ports (40*o*1, 40*o*2, 40*o*3, 40*o*4), and storing the monitored power and the associated ones of the relative phase shifts; and (c) repeating the steps of applying and selecting for the plurality of operating frequencies, to thereby generate a database of output power as a function of operating frequency and relative phase shift.

The method includes the step of selecting a specific operating frequency from among the plurality of potential operating frequencies, and retrieving relative phase shifts of the signals at the specific operating frequency from the database, to thereby generate retrieved relative phase shifts. The retrieved relative phase shifts are applied whenever the specific operating frequency is selected for transmission.

What is claimed is:

1. A method for aligning a radar system which uses phase-controlled steering of signals in a multitier hybrid including plural input ports and plural output ports, said method comprising the steps of:

selecting an operating frequency for transmission;

applying signal at said operating frequency to said plural input ports to thereby define applied signals;

stepping the relative phase shift of said applied signals while monitoring the power appearing at said plural output ports, and storing signals representing said powers and the associated ones of said relative phase shifts; and repeating said steps of selecting and applying for a plurality of operating frequencies, to thereby generate a database of output power as a function of frequency and relative phase shift.

2. A method for operating a radar system which uses phase-controlled steering of signals in a multitier hybrid including plural input ports and plural output ports, said method comprising the steps of:

selecting a plurality of potential operating frequencies for transmission;

aligning said radar system by the steps of (a) applying signal at one of said operating frequencies to said plural input ports to thereby define applied signals;

(b) stepping the relative phase shift of said applied signals at said one of said operating frequencies while monitoring the power appearing at said plural output ports, and storing signals representing said power and the associated ones of said relative phase shifts; and (c) repeating said steps of applying, stepping, monitoring, and storing for said plurality of operating frequencies, to thereby generate a database of output power as a function of operating frequency and relative phase shift;

from among said plurality of potential operating frequencies, selecting a specific operating frequency;

retrieving relative phase shifts of the signals at said specific operating frequency from said database, to thereby generate retrieved relative phase shifts; and applying said retrieved relative phase shifts whenever said specific operating frequency is selected for transmission.

* * * * *